Oct. 4, 1932.   R. E. BUCKNER   1,880,762
COTTON PICKING MACHINE
Filed Dec. 13, 1930   7 Sheets-Sheet 3
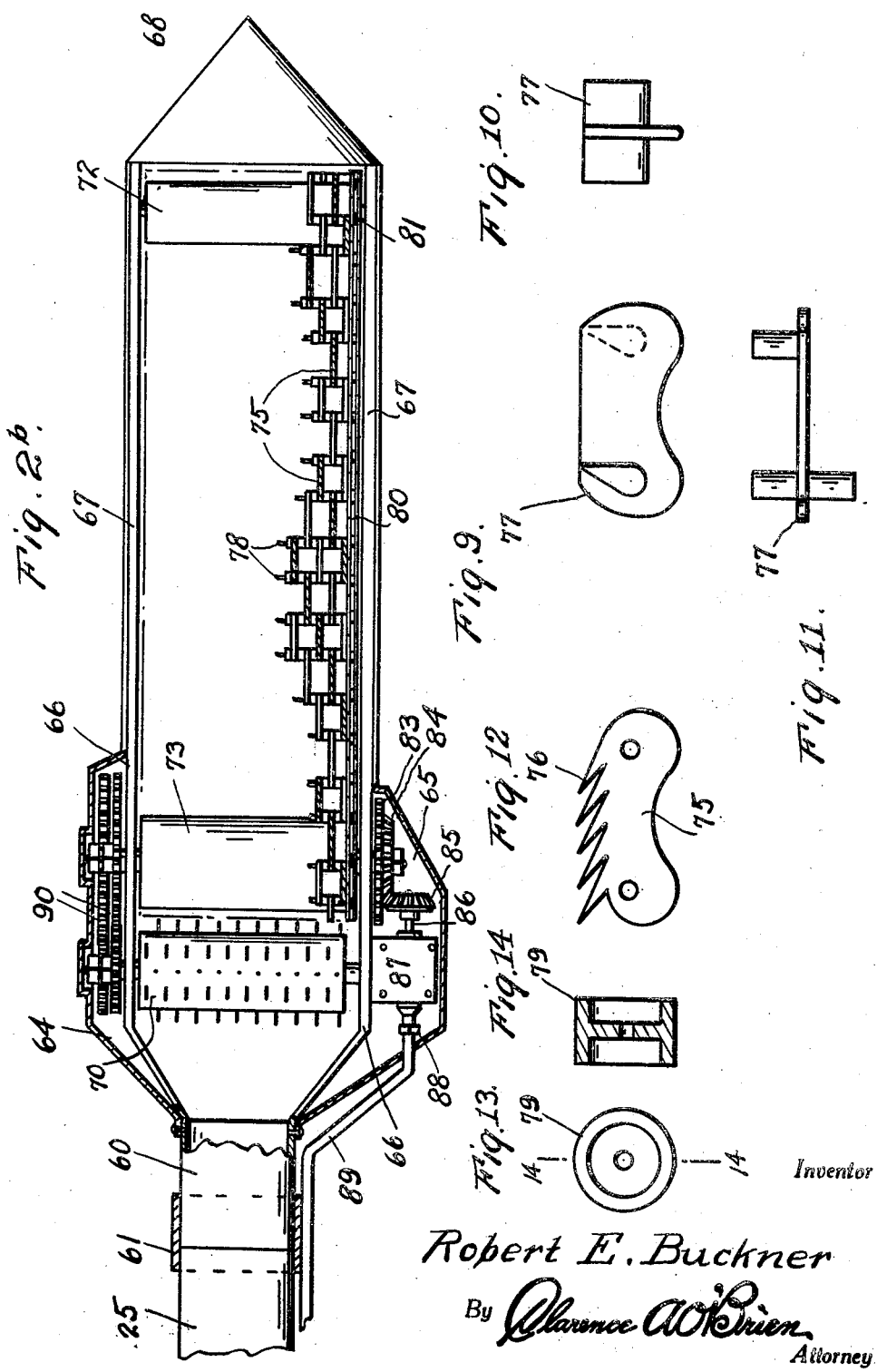
Inventor
Robert E. Buckner
By Clarence A. O'Brien
Attorney

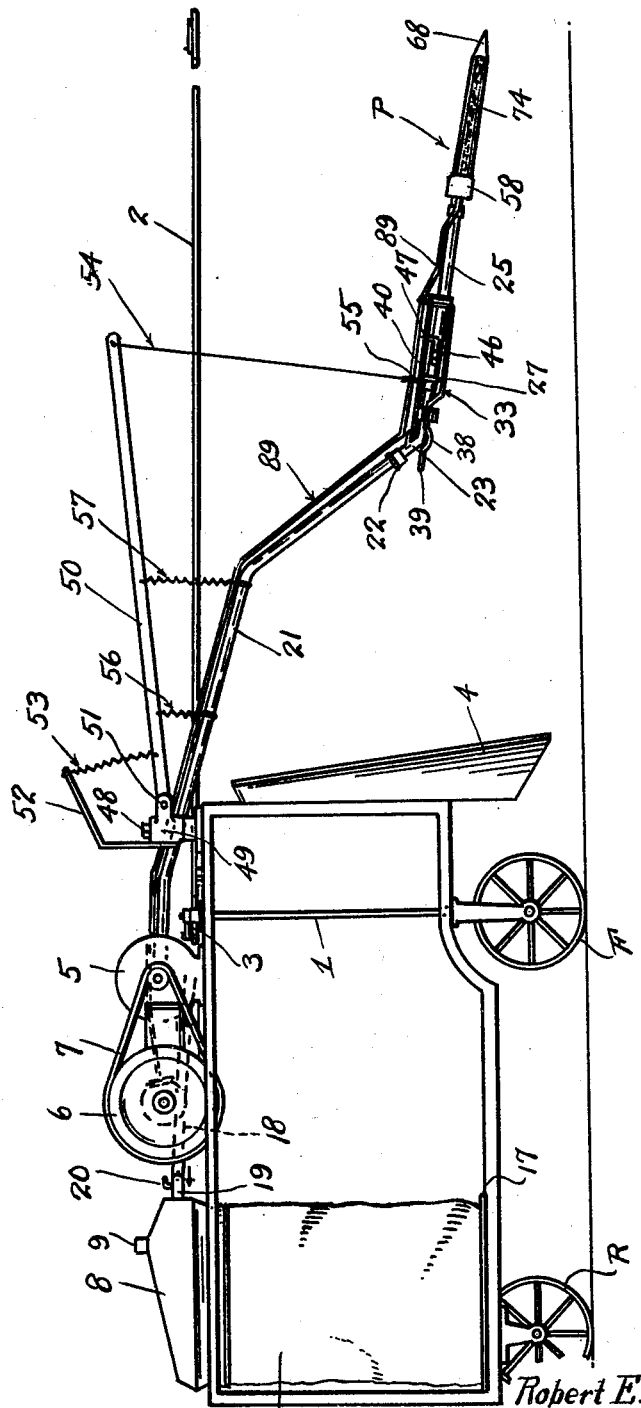

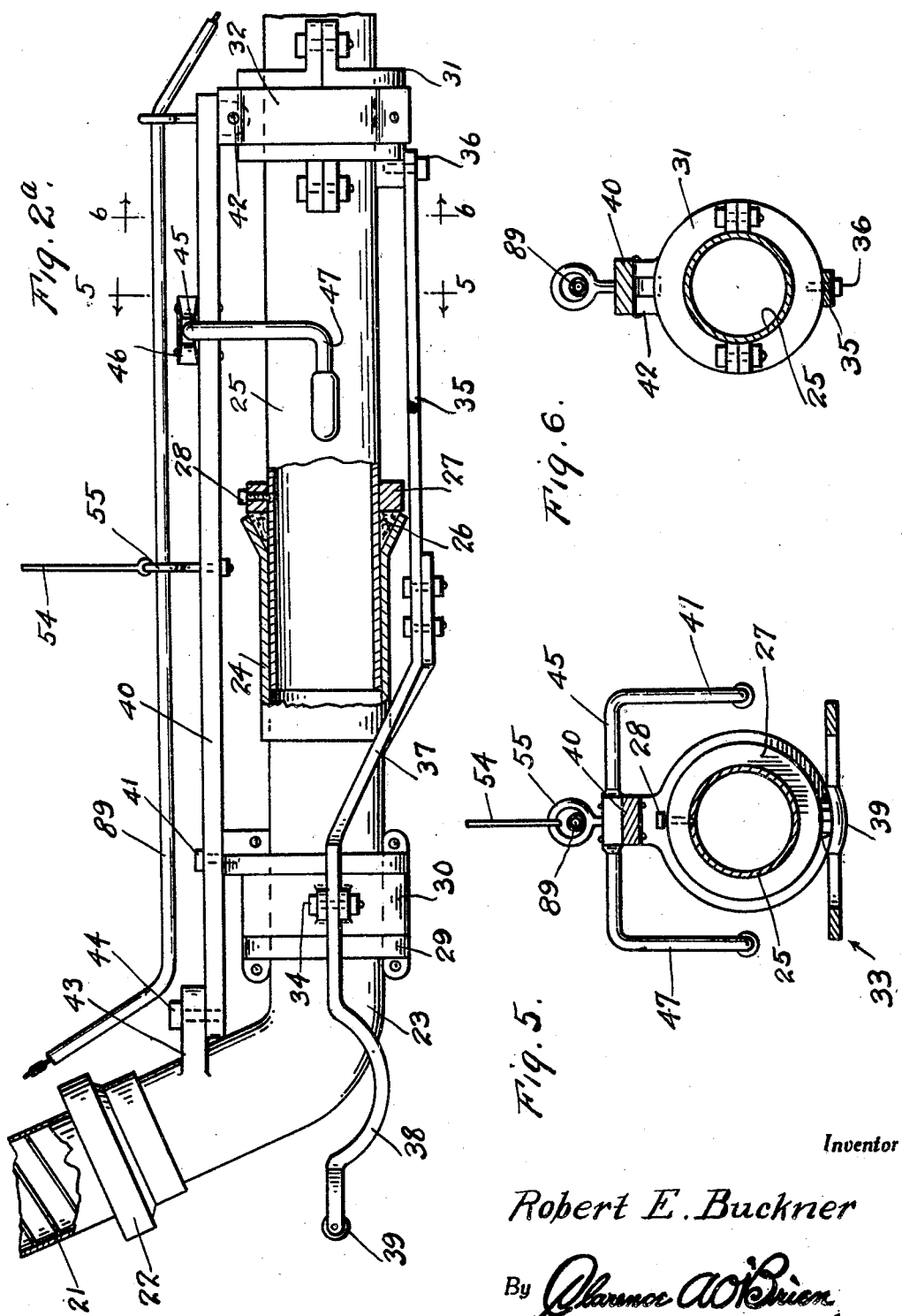

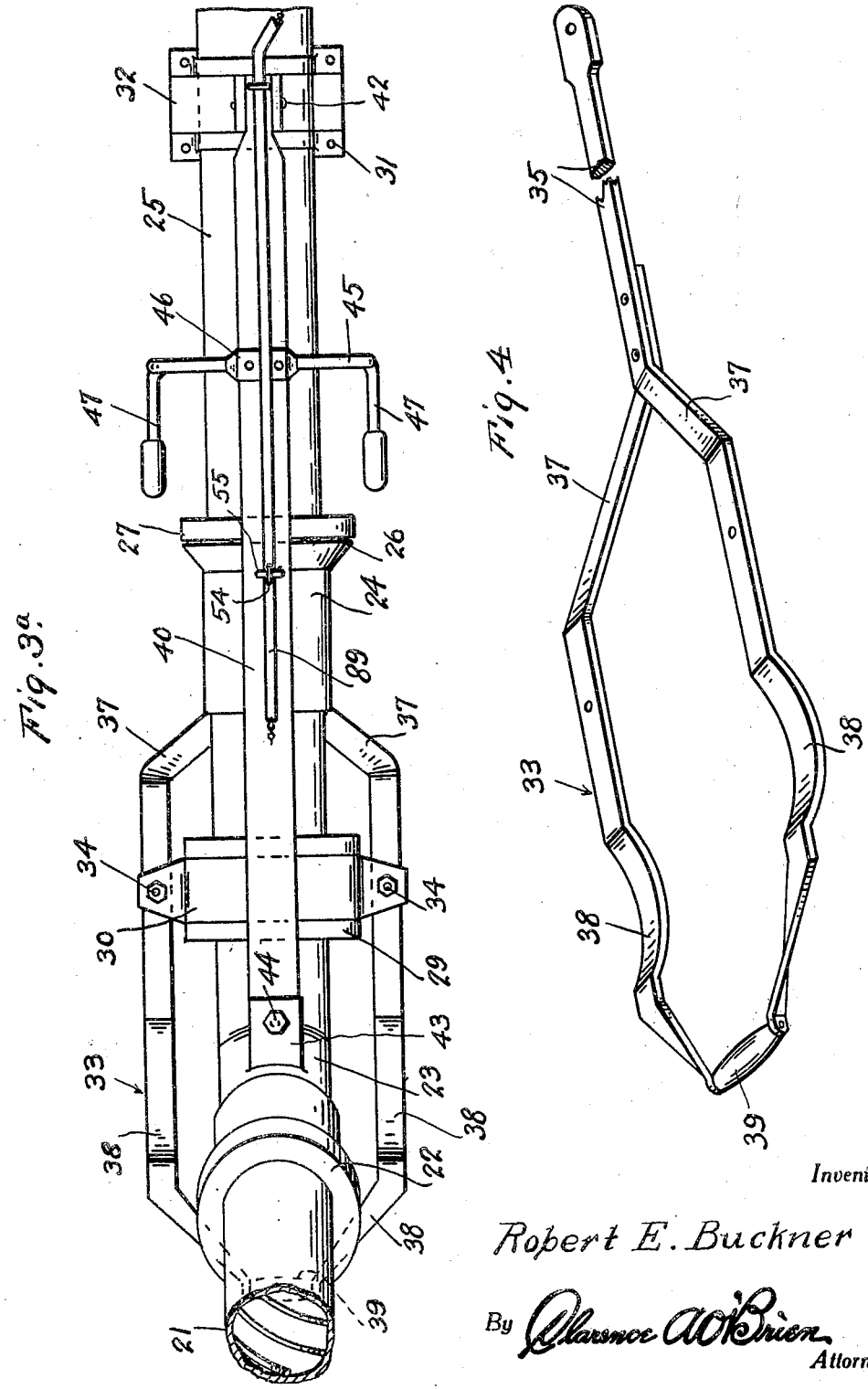

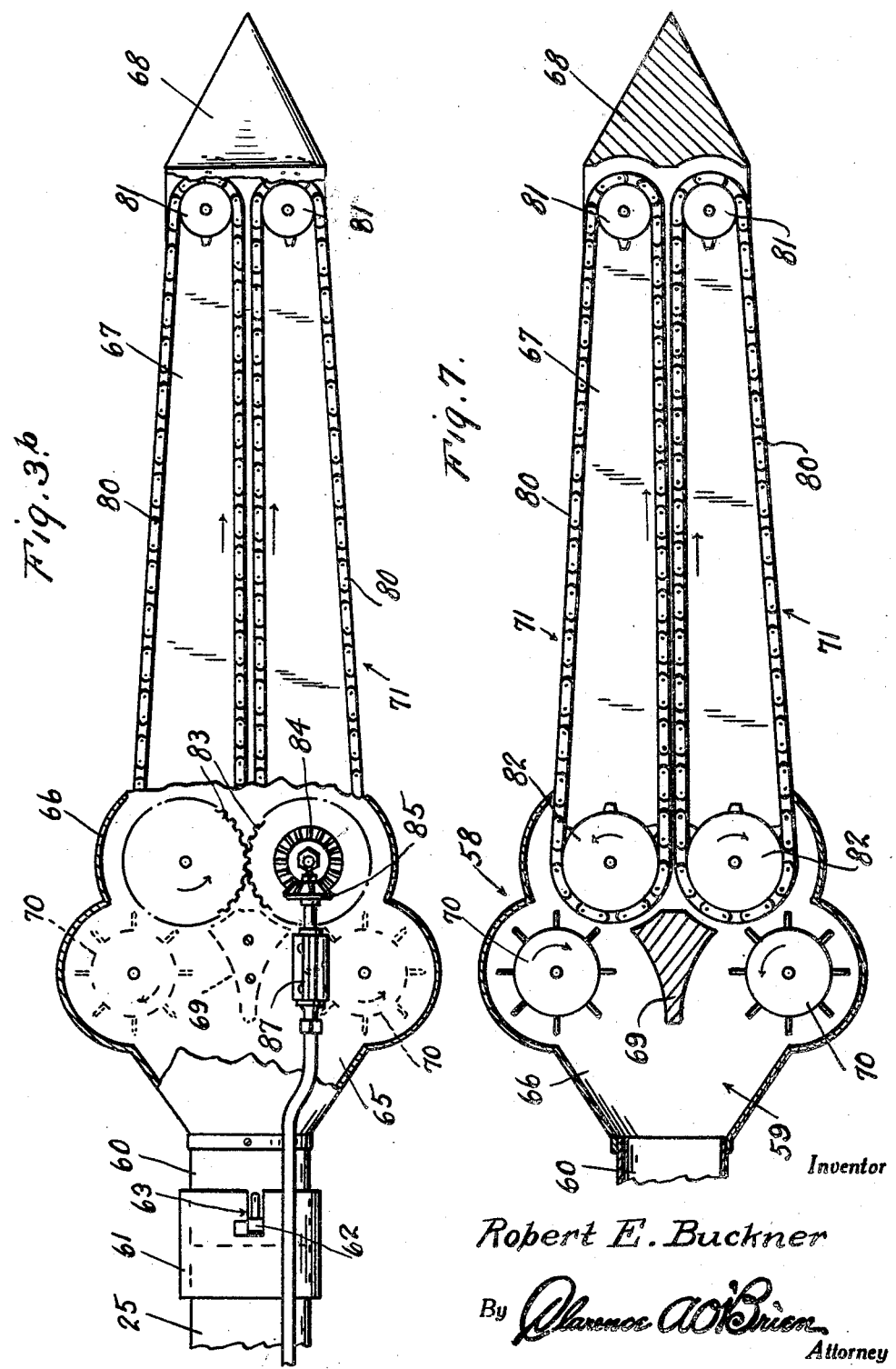

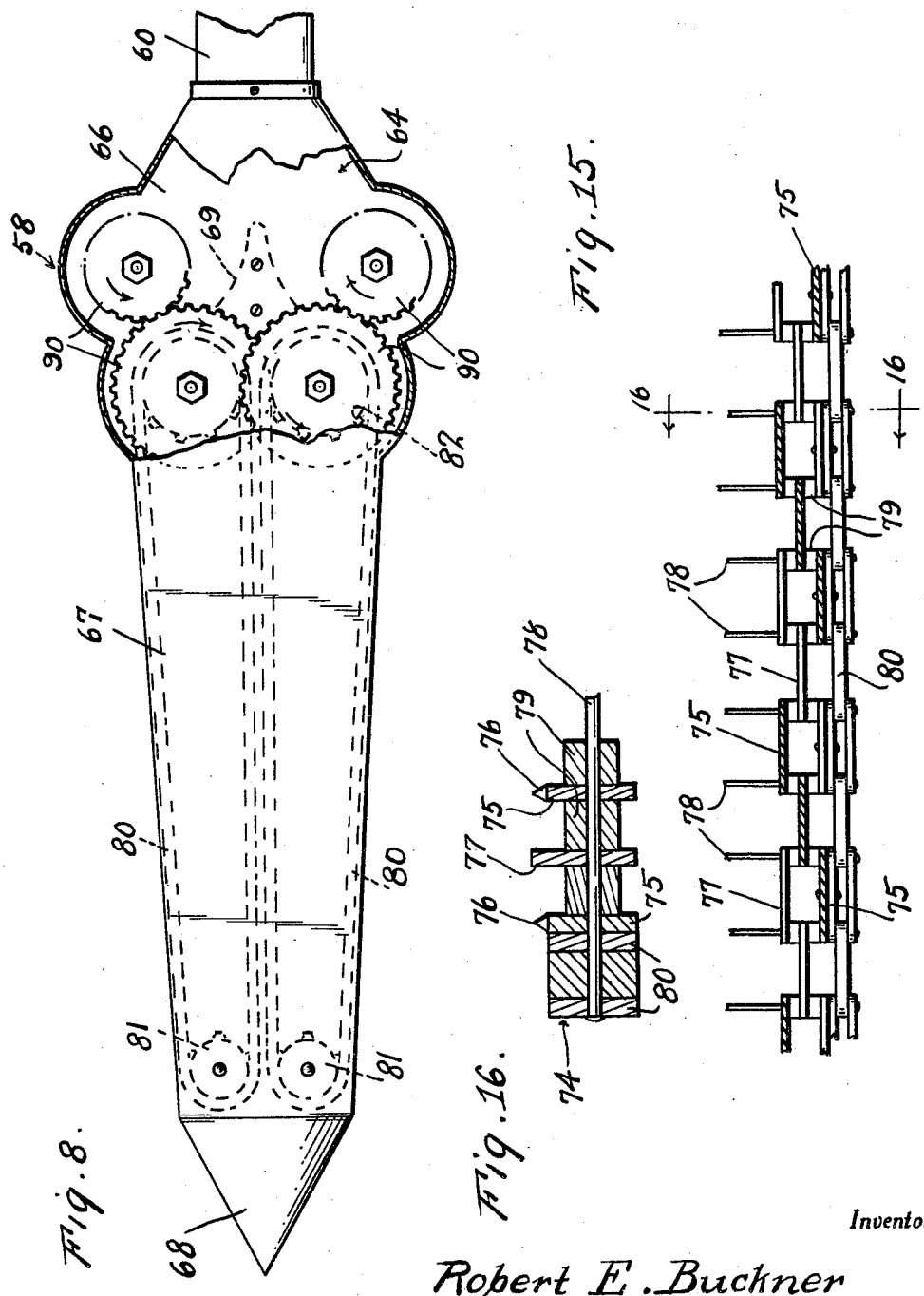

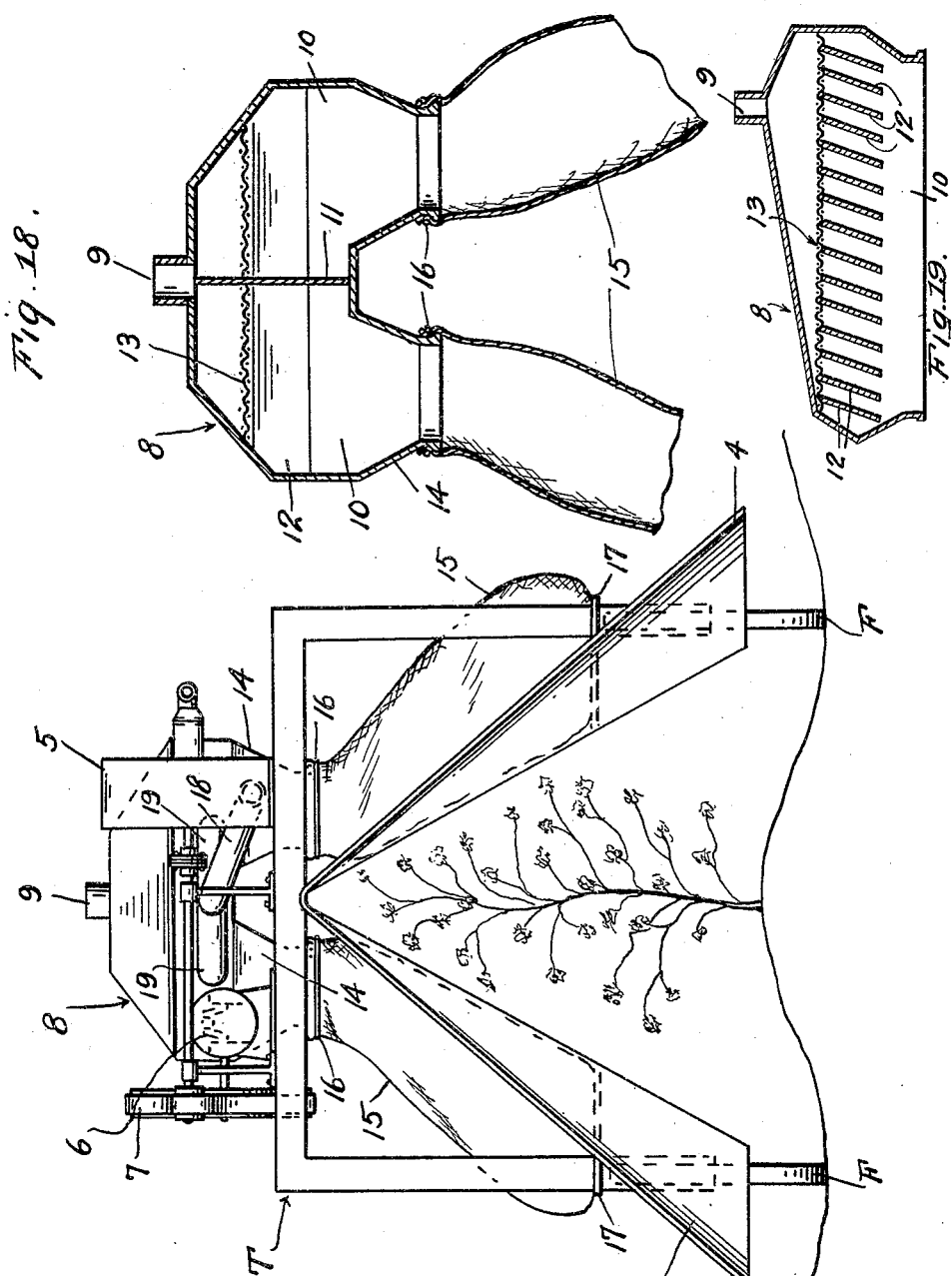

Patented Oct. 4, 1932

1,880,762

UNITED STATES PATENT OFFICE

ROBERT E. BUCKNER, OF IRAAN, TEXAS

COTTON PICKING MACHINE

Application filed December 13, 1930. Serial No. 502,211.

This invention relates to certain new and useful improvements in cotton picking machines, and the primary object of this invention is to provide a cotton picker including means for picking the cotton, and for sacking or bundling the picked cotton all in the one operation.

A still further object of the invention is to provide a picking machine for cotton, that includes a picker head that is capable of angular adjustment to insure a thorough and efficient picking of the cotton, and a still further object of the invention is to provide a picking head that is swingable on a vertical axis to the right and left so that the picker head may be placed as near as is necessary to the plant to insure contact of the picking medium with the cotton to be picked.

Other objects and advantages of the invention will become more apparent during a study of the following description, taken in connection with the accompanying drawings wherein:

Figure 1 is a side elevational view of the machine, with the picker head disposed in normal position.

Figure 2a is a fragmentary side elevational view of a portion of the suction conduit and associated parts, the picker head not shown.

Figure 2b is a continuation of Figure 2a showing in side elevation the picking head, certain parts being shown in section and other parts being broken away.

Figure 3a is a top plan view of the structure shown in Figure 2a.

Figure 3b is a horizontal sectional elevational view through the picker head.

Figure 4 is a perspective view of a handle member forming part of the invention.

Figures 5 and 6 are transversely sectional views taken substantially on the lines 5—5 and 6—6 respectively of Figure 2a.

Figure 7 is a horizontal longitudinal sectional view taken through the picker head, certain parts being shown in elevation.

Figure 8 is a top plan view of the picker head, certain parts being broken away for more clearly illustrating details of construction which will be hereinafter more fully referred to.

Figure 9 is a side elevational view of a blank or protecting link forming a part of the endless belt embodied in the picking head structure.

Figure 10 is an end elevational view thereof.

Figure 11 is a top plan view thereof.

Figure 12 is a side elevational view of a gathering link forming part of the endless chain structure embodied in the picking head structure.

Figure 13 is an elevational view of a spacer.

Figure 14 is a transverse sectional view taken substantially on the line 14—14 of Figure 13.

Figure 15 is a fragmentary plan view of the endless belt or chain structure.

Figure 16 is a fragmentary detail view taken substantially on line 16—16 of Figure 15.

Figure 17 is a front elevational view of the carriage, the picker head and associated parts being removed.

Figure 18 is a detail sectional view taken through a distributor casing and receiving sacks associated therewith.

Figure 19 is a vertical sectional view through the distributor hopper showing the arrangement of baffles in one of the chambers thereof.

Referring in detail to the drawings, it will be seen that the cotton picking machine comprises a frame like carriage or truck T mounted on front wheels F and rear wheels R. The frame body of the truck comprises upper and lower side members connected by vertical front and rear end members and the upper side members at the front and rear of the truck are connected by cross members. The rear wheels R are mounted on stub axles journalled in fork brackets carried by the lower side members of the truck body. The front wheels F are also mounted on stub axles journalled in forks swivelly associated with the lower side members of the truck, and for each of said fork members there is suitably associated a vertical rod 1, which rods 1 are suitably connected together, and connected with a suitable draft tongue 2 through suitable means designated generally by the reference character 3. Such structure does not form the essence of my invention, and a more detailed description thereof is consequently thought unnecessary. It is sufficient to note, and as is apparent from a study of Figure 17, that the truck is capable of straddling the row of cotton plants, the truck being equipped at the forward end of an inverted V-shaped fender structure 4 for guiding the plant limb under the truck.

Suitably mounted in the truck body is a suction fan structure 5 driven from a prime mover 6 through the medium of belt and pulley drive means 7.

Also mounted in the truck body adjacent the rear end thereof is a distributor hopper 8 that is provided at the top thereof with an air exhaust 9 common to a pair of separating or expanding chambers 10. The chambers 10 are separated by a vertical partition wall 11. Arranged in each of the chambers is a horizontal row or series of spaced baffle boards 12 arranged between the top and bottom of the chamber. The baffle boards 12 are disposed at a suitable angle to the perpendicular, and above the baffle boards is mounted in the chamber a horizontally disposed wire mesh screen 13. (See Figure 18).

As is also best shown to advantage in Figure 18, each of the chambers 10 at the bottom thereof merges into a discharge neck 14 and a sack 15 for receiving the picked cotton is secured to the lower end of the neck, the opened upper end of the sack 15 being clamped about the discharge end of the neck 14 by a suitable clamping ring 16

The sacks 15 have their bottoms resting on suitable platforms 17 provided therefor in the truck body T adjacent the rear of the truck body (see Figure 17).

Leading from the discharge end of the fan casing of fan 5 is a conduit pipe 18 that merges into a pair of branches 19 that connect one with each of the chambers 10. Passage of the picked cotton from the fan casing of fan 5 into a selected one of the chambers 10 is controlled by a suitable valve 20 arranged at the junction of the diverging branches 19.

Leading from the intake end of the casing of said fan 5, is a flexible conduit or hose 21. The conduit or hose 21 terminates forwardly of the truck T, and at the free forward end of the hose 21 there is suitably coupled as at 22 an angular rigid pipe section 23. On the free end of the pipe section 23 is a coupling sleeve 24, which sleeve 24 telescopically receives one end of a rotatable pipe section 25.

The end of the sleeve 24 farthest remote from pipe section 23 is flared and arranged in the flared end of the sleeve 24 and extending about pipe section 25 is a packing 26.

The packing 26 is combined within the flared end of sleeve 24 through the medium of a packing ring 27 retained in position on pipe section 25 through the medium of a set screw 28.

On the horizontal end portion of pipe section 23 there is clamped a two-part collar 29 that is peripherally grooved. Received in the groove of the collar 29 and rotatable relative thereto is a two-part yoke 30. On pipe section 25 there is fixedly mounted a two-part collar 31 that is also peripherally grooved, and accommodates in the groove a relatively fixed or non-rotating two-part yoke 32.

A handle structure includes an elongated loop like end portion 33 that has opposite portions secured to diametrically opposite sides of the rotatable yoke 30 as at 34. The means 34 which consists of lugs at corresponding ends of the arcuate sections of yoke 30 and bolts extending through said lugs also serve as the means for securing said sections or parts of the yoke 30 in assembled relation within the groove of collar 29 as is thought apparent. The looped portion 33 of the handle at one end merges into a relatively elongated bar extension 35. At its free end bar extension 35 is secured as at 36 to the collar 31 on pipe section 25.

It will be noted that the looped portion 33 of the handle at one end is offset downwardly as at 37 and adjacent its opposite ends has opposite portions longitudinally bowed or curved as at 38. The portions 38 merge into rearward extensions connected by a suitable hand grip 39.

Thus to rotate the pipe section 25 one may grip the hand grip 39 of the handle and by a proper twist of the wrist rotate pipe section 25 about ninety degrees to the right or the left. The fixed collar 29, and the nonrotating yoke 32 are connected by a bar 40 secured to the collar 29 as at 41 and to the yoke 32 as at 42. At one end bar 40 is secured to a lug 43 integral with pipe section 23. A bolt 44 secures said end of bar 40 with the lug 43.

Mounted on bar 40 and extending transversely thereof is a handle that includes a transverse rod 45 secured transversely of bar 40 as at 46. At each end thereof, bar 45 terminates in angular handle members 47. The handle just described may be gripped either from the right or left hand side by an operator walking aside the machine during picking operation.

Rising from the truck body T adjacent the forward end thereof is a vertical pintle 48. Rotatable on the pintle 48 is a sleeve 49 and a supporting beam 50 is pivoted at one end as at 51 to the sleeve 49. Rising from sleeve 49 is an angular hanger 52 and a spring 53 is connected at its upper end to the free end of hanger 52. The lower end of spring 53 is connected to the beam 50 adjacent the pivoted end of the beam. A flexible member 54 is secured at its upper end to the free end of the beam 50, and at its lower end the flexible member 54 is secured to an eye bolt 55 suitably engaged with an intermediate portion of bar 40.

Thus it will be seen that the structure on the free end of hose 21, and embodying the pipe section 23 and pipe section 25 will be normally supported in raised position above the ground, and one gripping the handle members 47 on either side of the machine, may swing the entire assembly including said pipe sections 23 and 25 either to the right or left as may be desired.

An intermediate portion of flexible hose or conduit 21 is also supported from the beam 50 through the medium of a pair of coil springs 56, 57 connected at one end to the beam 50, and at their lower ends to flexible hose or conduit 21, (see Figure 1).

On the free end of pipe section 25 is a picker head assembly designated generally by the reference character P.

Referring more particularly to Figures 2b, 3b, 7 and 8, it will be seen that the picker head assembly includes a relatively large casing 58 that adjacent its rear end is provided with a vacuum chamber 59 having an outlet neck 60 leading rearwardly therefrom. The free end of the neck 60 is telescopically received in one end portion of a coupling sleeve 61 integral with the free end of rotatable pipe section 25. Neck 60 is provided with a radial lug 62 adapted to be received in an L-shaped notch 63 provided in sleeve 61 for coupling the picker assembly to said pipe section 25 for rotation therewith.

Casing 58 is divided into a pair of gear chambers 64, 65 through the medium of spaced partitions 66. Partitions 66 merge into spaced parallel coextensive partitions 67, which partitions 67 at their free ends are connected by a conical member 68. Conical member 68 is preferably solid and is formed of rubber or other suitable yieldable material and provides a guide point for the picker assembly.

Extending between partitions 66 is a dividing member 69, which member 69 extends between a pair of pick-up or release drums 70 suitably journalled between said partitions 66. The drums 70 are provided on their periphery with suitable teeth for picking up or brushing the picked cotton from the conveyor belt 71—71.

The endless conveyor belt 71—71 extends in parallelism longitudinally of the picker head assembly from the point 68 inwardly of the casing 58, and respectively includes a relatively small drum 72 journalled in the forward end of the picker head or that end adjacent the point 68, and a relatively large drum 73 journalled between the extensions 67 adjacent one of the pick up drums 70. Trained over the drums 72, 73 is an endless conveyor belt 74 that includes a plurality of picking media in the nature of links 75 provided with picking teeth 76, and non-toothed or plane links 77. The planed or non-toothed links 77 are arranged in alternate relation with respect to the toothed links, or gathering links 75, and the purpose of the links 77 is to protect the stalk, young bolls and limbs of the cotton plant from the ravages of the tooth equipped or gathering links 75. Further the blank or non-toothed links 77 will keep all hard substances from the toothed or gathering links 75 without hindering the gathering teeth 75 in picking of the open cotton.

The arrangement of the gathering belt will be best understood from a study of Figure 16 and from a study of Figure 15, the ends of the links 75 and 77 being supported through the medium of longitudinally spaced transverse rods 78, and each row of links include a plurality of toothed links 75 and blank or non-toothed links 77 arranged in alternate relation, and at corresponding ends spaced from one another through the medium of spacing blocks or elements 79.

While I have shown this particular type of gathering belt, it is to be understood that I do not wish to limit myself to such a type of belt as there are many other types of gathering belts that may be with facility embodied in the picker head assembly comprehended by the present invention.

The gathering belt just described, also includes an endless chain 80 trained over sprockets 81, 82 on corresponding ends of drums 72, 73 for transmitting movement of drum 73 to drum 72 for effecting movement of the gathering belt in the direction indicated by the arrows in Figure 3b.

The drums 73 of the gathering belt assembly are operatively connected together through the medium of gearing 83 arranged in the gear compartment 65. On the corresponding end of one drum 73 is a bevel gear 84 meshing with a bevel gear 85 on one end of a shaft 86 journalled in a bearing block 87 arranged in the gear chamber 65. Shaft 86 is coupled as at 88 to one end of a flexible drive shaft 89 which flexible shaft 89 is in turn suitably coupled to the shaft of the prime mover or motor 6.

The movement of drums 73 is transmitted to the pick up drum 70 through the medium of suitable gearing 90 arranged in the gear chamber 64.

From the foregoing then it will be seen that when the motor is in operation, the endless gathering belt, pick up drum 70 and suction fan are all simultaneously operated.

The operation of the device is thought apparent from the foregoing, however it may be briefly stated, that in operation the picking machine is drawn along the ground, so that the truck straddles the row of cotton plants to be picked. The operator may walk beside the machine holding one end portion 47 of the handle bar 45, and with the other hand gripping the hand grip 39 rotate pipe section 25 and the picking head assembly associated therewith so that the gathering belt of the picker head assembly may be brought into contact with the cotton to be picked, the gathering toothed links 75 engaging the cotton fibers so that the picked cotton is carried rearwardly toward the pick up drum 70 to be picked or brushed from the gathering belt and thrown into the vacuum chamber 59. From the chamber 59 through the medium of suction created by the fan, the cleaned cotton will be drawn through the flexible hose 21 into the casing of the fan and from the fan casing through the conduit 18 and from the conduit 18 through a selected one of the branches 19 as controlled by the valve 20 into a chamber 10, and from the chamber to fall by gravity into the sack or bag 15. Obviously when one bag becomes filled, the valve 20 is suitably manipulated for directing the picked cotton into the other of the said chambers 10 to pass from that chamber into the bag or sack 15 associated with the outlet or discharge neck of that particular chamber.

As is manifest, the picking assembly being in advance of the truck, the cotton will have been picked, prior to the passing of the truck over the cotton plants, otherwise considerable open cotton would be knocked to the ground resulting in waste.

Even though I have herein shown and described the preferred embodiment of the invention, it is to be understood that the invention is susceptible of changes and modifications coming within the scope of the claims.

Having thus described my invention, what I claim as new is:

1. A cotton picking machine including in combination a picker assembly comprising a casing, a pair of spaced parallel coextensive extensions projecting from the casing, a substantially conical member connecting the ends of said extensions remote from the casing, a pair of parallel endless gathering belts mounted between said extensions, said casing provided with a suction chamber for receiving the picked cotton from said endless belts.

2. A cotton picking machine including in combination a picker assembly comprising a a casing, a pair of spaced parallel coextensive extensions projecting from the casing, a substantially conical member connecting the ends of said extensions remote from the casing, a pair of parallel endless gathering belts mounted between said extension, said casing provided with a suction chamber for receiving the picked cotton from said endless belts, a pair of picker drums mounted in said casing adjacent one end of said belts for transferring the picked cotton from the belts to said suction chamber.

3. A cotton picking machine including in combination a picker assembly comprising a casing, a pair of spaced parallel coextensive extensions projecting from the casing, a substantially conical member connecting the ends of said extensions remote from the casing, a pair of parallel endless gathering belts mounted between said extension, said casing provided with a suction chamber for receiving the picked cotton from said endless belts, a pair of picker drums mounted in said casing adjacent one end of said belts for transferring the picked cotton from the belts to said suction chamber, a partition member extending transversely of said casing between said picker drums for directing the cotton from the respective drums into said suction chamber, and means for simultaneously operating said picker belts and said picker drums.

4. A cotton picking machine including in combination a flexible conduit, a relatively rigid section coupled with said conduit at one end of the latter, a second relatively rigid pipe section, means for connecting said second pipe section with the first pipe section in alinement one with the other and for rotation of the second pipe section axially relative to the first pipe section, a member rotatably mounted on the first pipe section, a second member fixedly mounted on the second pipe section, means operatively connecting said members and constituting a handle to facilitate rotation of said second pipe section, and a cotton picker head connected with the second pipe section and including a suction chamber having an outlet in alinement with said second pipe section.

5. In a cotton picking head, an endless gathering conveyor comprising transverse rows of alternate toothed and non-toothed links.

6. In a cotton picking head, a pair of opposed parallel endless gathering belts each of which includes transverse rows of alternate toothed and non-toothed links, with the toothed and non-toothed links of each row being arranged in staggered relation with respect to the corresponding teeth of an adjacent row, said toothed links constituting the gathering media of the endless belts, and the non-toothed links constituting protective media for protecting the stalks, young bolls, and limbs of the cotton plants from being ravaged by the toothed or gathering links.

7. In a cotton picking head, a gathering element comprising a plurality of toothed and non-toothed elements, whereby means is provided for gathering the cotton, and protecting the stalks, young bolls, and limbs of the cotton against damage.

In testimony whereof I affix my signature.

ROBERT E. BUCKNER.